United States Patent
Tarbotton et al.

(10) Patent No.: US 8,069,480 B1
(45) Date of Patent: Nov. 29, 2011

(54) METHOD AND SYSTEM FOR DEFINING A SAFE STORAGE AREA FOR USE IN RECOVERING A COMPUTER SYSTEM

(75) Inventors: Lee Codel Lawson Tarbotton, Leicester (GB); Paul Nicholas Gartside, Milton Keynes (GB); Daniel Joseph Wolff, Bucks (GB)

(73) Assignee: McAfee, Inc., Santa Clara, CA (US)

( * ) Notice: Subject to any disclaimer, the term of this patent is extended or adjusted under 35 U.S.C. 154(b) by 3051 days.

(21) Appl. No.: 10/262,307

(22) Filed: Sep. 30, 2002

(51) Int. Cl.
*G06F 21/00* (2006.01)

(52) U.S. Cl. ............. 726/22; 726/24; 713/187; 713/188

(58) Field of Classification Search .................. 726/24, 726/22; 713/187, 188
See application file for complete search history.

(56) References Cited

U.S. PATENT DOCUMENTS

| | | | | |
|---|---|---|---|---|
| 5,086,502 A * | 2/1992 | Malcolm | | 714/8 |
| 5,349,655 A * | 9/1994 | Mann | | 714/6 |
| 5,598,531 A * | 1/1997 | Hill | | 726/24 |
| 5,713,024 A * | 1/1998 | Halladay | | 717/168 |
| 5,745,669 A * | 4/1998 | Hugard et al. | | 714/3 |
| 5,802,277 A * | 9/1998 | Cowland | | 726/22 |
| 5,822,517 A * | 10/1998 | Dotan | | 726/22 |
| 5,826,012 A * | 10/1998 | Lettvin | | 726/22 |
| 6,029,256 A | 2/2000 | Kouznetsov | | |
| 6,035,423 A | 3/2000 | Hodges et al. | | |
| 6,067,410 A * | 5/2000 | Nachenberg | | 703/28 |
| 6,195,695 B1 | 2/2001 | Cheston et al. | | 709/221 |
| 6,205,558 B1 * | 3/2001 | Sobel | | 714/15 |
| 6,230,285 B1 | 5/2001 | Sadowsky et al. | | 714/14 |
| 6,304,965 B1 * | 10/2001 | Rickey | | 713/2 |
| 6,317,845 B1 | 11/2001 | Meyer et al. | | 714/23 |
| 6,347,375 B1 * | 2/2002 | Reinert et al. | | 726/24 |
| 6,519,762 B1 * | 2/2003 | Colligan et al. | | 717/170 |
| 6,611,850 B1 * | 8/2003 | Shen | | 707/204 |
| 6,732,293 B1 * | 5/2004 | Schneider | | 714/15 |
| 6,910,151 B2 * | 6/2005 | Qin et al. | | 714/6 |
| 6,931,552 B2 * | 8/2005 | Pritchard et al. | | 726/34 |
| 7,114,184 B2 * | 9/2006 | Malivanchuk et al. | | 726/24 |
| 2002/0144129 A1 * | 10/2002 | Malivanchuk et al. | | 713/188 |
| 2002/0178374 A1 * | 11/2002 | Swimmer et al. | | 713/200 |
| 2003/0182301 A1 * | 9/2003 | Patterson et al. | | 707/102 |

OTHER PUBLICATIONS

David D. Langan, Thomas J Scott, "A Methodology for PC Hard Disk State Restoration"; ACM 1992; pp. 1105-1110.*

* cited by examiner

*Primary Examiner* — Carl Colin
*Assistant Examiner* — Harunur Rashid
(74) *Attorney, Agent, or Firm* — Patent Capital Group

(57) ABSTRACT

A method for defining an area to record changes made to a computer system is provided. A safe area is defined on a primary storage device of the computer system and information is stored on the location of the safe area on a secondary storage device. Further, the computer system is booted utilizing a backup device and data is changed on the primary storage device. The changes are recorded in the safe area of the primary storage device and are accessible when the computer system is booted from the backup device.

30 Claims, 5 Drawing Sheets

METHOD AND SYSTEM FOR DEFINING A SAFE STORAGE AREA FOR USE IN RECOVERING A COMPUTER SYSTEM

BACKGROUND OF THE INVENTION

The present invention relates generally to recovering a computer system, and more particularly, to a system and method for defining a safe quarantine area on a disk for use in storing information about changes made to the disk during a virus cleaning operation. The information is used to recover data if the computer system is corrupted during cleaning of the system for viruses.

A huge surge in computer viruses has occurred in the last decade. Computer viruses have gone from an academic curiosity to a persistent, worldwide problem. Today, viruses affect vast numbers of computers in locations throughout the world. A computer virus is generally a manmade destructive computer program or code that is loaded onto a computer system without the knowledge of the user. The computer virus is often a self-replicating program containing code that explicitly copies itself and can infect other programs by modifying them or their environment. Even a simple virus can be dangerous as the virus can quickly use a large portion of the available memory and possibly bring down the computer system.

Viruses can be written for, and spread on, virtually any computing platform. A virus can infect, or become resident in almost any software component, including an application, operating system, system boot code, or device driver. Computer viruses spread by attaching themselves to other programs (e.g., word processing or spreadsheet applications) or to a boot sector of a disk. When an infected file is activated or executed, or when the computer is started from an infected disk, the virus is also executed and attempts to infect other files. Since a virus is software code, it can be transmitted along with any legitimate software that enters the computer environment.

The term virus generally refers to any destructible or harmful program or code that attempts to hide its possibly malicious function or tries to spread onto as many computers as possible. One common type of virus is a macro virus which is encoded as a macro embedded in a document. Many applications support macro languages which allow the user to embed a macro in a document and have the macro execute each time the document is opened. Once a computer system is infected with a macro virus, the virus can embed itself in all future documents created with the associated application.

Another common virus is a boot sector virus which replaces the computer system's master boot record with its own code. The boot sector virus is a small program executed each time a computer boots. The virus infects floppy disks and hard disks by inserting itself into the boot sector of the disk, which contains code that is executed during the system boot process. Since the master boot record executes every time the computer is started, the boot sector virus can be very dangerous to the integrity of the computer system. The boot sector virus typically enters the computer system through a floppy disk installed in the floppy drive when the computer system is started. Other types of viruses include polymorphic virus, Trojan horse, and computer worm.

Many anti-virus programs have become commercially available for protection against viruses. There are three main types of anti-virus software: activity monitors, integrity checkers, and scanners. Activity monitoring programs attempt to prevent infection before it happens by looking for virus type activity, such as attempts to reformat a disk. Integrity checkers compute a small checksum or hash value for files which are presumably uninfected, and later compare newly calculated values with the original ones to see if the files have been modified. These programs catch unknown viruses as well as known ones. Integrity checkers may be called to check entire disks or they may be resident, checking each program that is about to be executed.

Scanners are the most widely used type of anti-virus program. Virus scanners generally operate in batch mode, scanning all files on a system, hard disk, or floppy disk, when requested by the user, or at set intervals. They look for known viruses by searching disks and files for scan strings or patterns. A scanner may be designed to examine specified disks or files on demand, or it may be resident, examining each program that is about to be executed. Most scanning programs include an update feature that allows the anti-virus program to download profiles of new viruses from the Internet so that the program can check for new viruses soon after they are discovered. Most scanners also include virus removers which are operable to clean infected files. One example of an anti-virus scanner is McAfee's VSHIELD.

A virus scan may be performed, for example, on a volume boot sector, such as an NTFS (NT File System) boot sector. The volume boot sector is created when a high-level format of a hard disk partition is performed. The volume boot sector includes a disk parameter block which contains information that is used by the operating system to determine where other internal structures of the partition are located. The boot sector's code is executed directly when the disk is booted, thus making it a favorite target for virus writers. The virus scan is typically performed on the hard drive with the system booted using a backup operating system. If infected files are found during the virus scan, a cleaning operation is performed. However, since the disk is being accessed without the use of the primary operating system, there is a risk of corrupting the data. For example, the infected disk may have been operable prior to cleaning but is no longer able to boot the computer system. If the data is corrupted during the cleaning process it may be necessary to return the computer system to the state it was in before cleaning of the disk was attempted, so that data on the disk is accessible. This requires that changes made during the cleaning operation be recorded so that the changes can be reversed, if required. Since these changes may be extensive, it is unlikely that they would fit onto a floppy disk or other removable storage device.

There are also other changes that may be made to the computer system, such as system upgrades or patches, which may require modification to data on a computer hard drive while the system is booted using a backup operating system.

There is, therefore, a need for a method and system for defining a safe area on the disk being modified to store changes made to the disk to return the computer system to the state it was in before the changes were made.

SUMMARY OF THE INVENTION

A method for defining an area to record changes made to a computer system is disclosed. The method generally comprises defining a safe area on a primary storage device of the computer system and storing information on the location of the safe area on a secondary storage device. The method further includes booting the computer system utilizing a backup device and changing data on the primary storage device. The changes are recorded in the safe area of the primary storage device and are accessible when the computer system is booted from the backup device.

The changes may include, for example, changes made during a virus cleaning operation, system upgrade, or patch installation.

A computer program product for defining an area to record changes made to a computer system generally comprises computer code that defines a safe area on a primary storage device of the computer system and stores information on the location of the safe area on a secondary storage device. The product further includes computer code that boots the computer system utilizing a backup device and changes data on the primary storage device and computer code that records changes made to the primary storage device in the safe area of the primary storage device. The recorded changes are accessible with the computer system booted from the backup device. A computer readable medium is provided to store the computer codes.

In another aspect of the invention, a method for restoring a computer system to a pre-virus cleaning configuration generally comprises booting a computer system utilizing a backup operating system, scanning a primary storage device for viruses, and cleaning the primary storage device of viruses identified during scanning. The changes made to the primary storage device during cleaning are recorded in a predefined area of the primary storage device. The method further includes attempting to boot the computer system utilizing the primary operating system and restoring at least a portion of the primary storage device to its configuration prior to cleaning if the computer system is not able to boot utilizing the primary operating system.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The system and method described herein are used to define a safe area on a storage device for recording changes made so that the changes can be reversed if needed for proper operation of the computer system. The changes may be made, for example, during a virus cleaning operation or during a system upgrade or patch. As described further below, the system defines a safe area within a storage device that can be safely accessed when the computer system is booted from a bootable disk (utilizing an operating system different from the normal operating system of the computer). The safe area includes information on how to recover the computer system if a cleaning operation results in changes to the computer that prevent it from booting from its normal operating system. The system may also be used to restore only a portion of the data if only some of the data was corrupted during the cleaning process.

Figure 1:
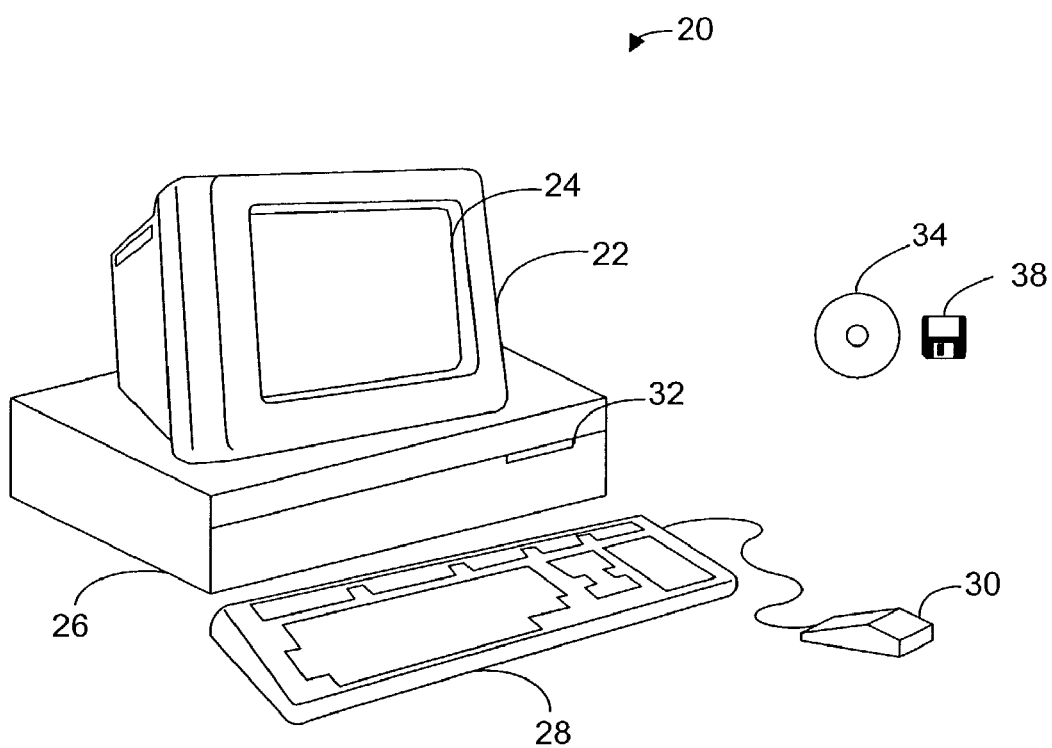
FIG. 1 is a schematic illustrating an example of a computer system that can be utilized to execute software of an embodiment of the invention.

Referring now the drawings, and first to FIG. 1, an example of a computer system that may be used to implement an embodiment of the present invention is shown and generally indicated at 20. The computer system 20 includes a display 22, screen 24, cabinet 26, keyboard 28, and mouse 30, which may include one or more buttons for interacting with a GUI (Graphical User Interface). Cabinet 26 houses a floppy or CD-ROM drive 32, system memory 42 and fixed storage 44 (see FIG. 2) which can be utilized to store and retrieve software programs incorporating computer code that implements aspects of the invention, data for use with the invention, and the like. Computer readable storage media include CD-ROM 34, floppy disk 38, hard drive 44, tape, flash memory, and system memory. Additionally, a data signal embodied in a carrier wave (e.g., in a network including the Internet) can be the computer readable storage medium.

Figure 2:
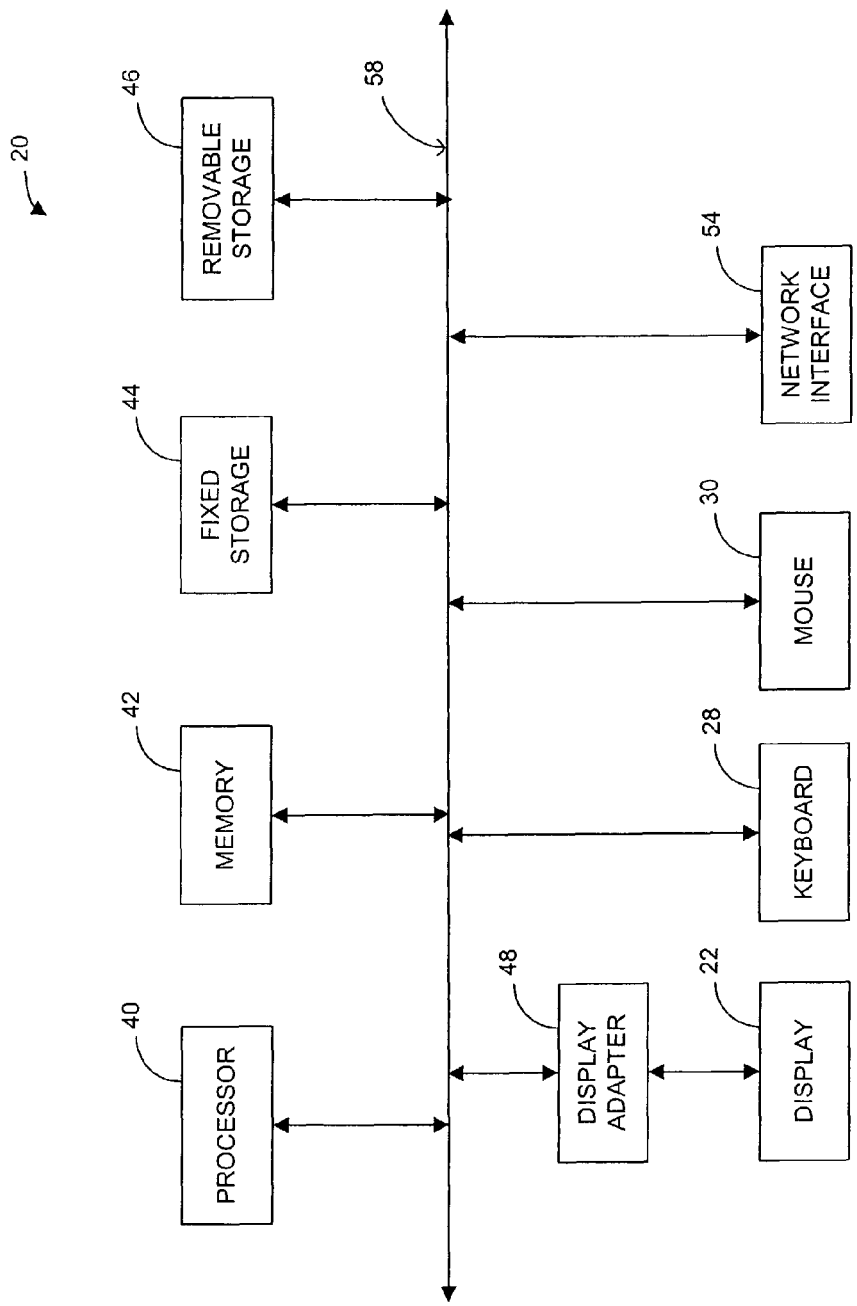
FIG. 2 is a system block diagram of the computer system of FIG. 1.

FIG. 2 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., floppy or CD-ROM), display adapter 48, and network interface 54. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 58 in FIG. 2. However, these arrows are only illustrative of one possible interconnection scheme serving to link the subsystems. For example, a local bus could be utilized to connect the central processor 40 to the system memory 42 and display adapter 48. Computer system 20 shown in FIGS. 1 and 2 is only one example of a computer system suitable for use with the invention. Other computer architectures having different configurations or subsystems may also be utilized.

The computer system may be a stand-alone desktop computer as shown in FIG. 1 or a laptop computer, mainframe computer, or handheld device (e.g., personal digital assistant (PDA) or mobile phone), for example. The computer system may be a personal computer or configured for use as a server or other networked computer.

Figure 3:
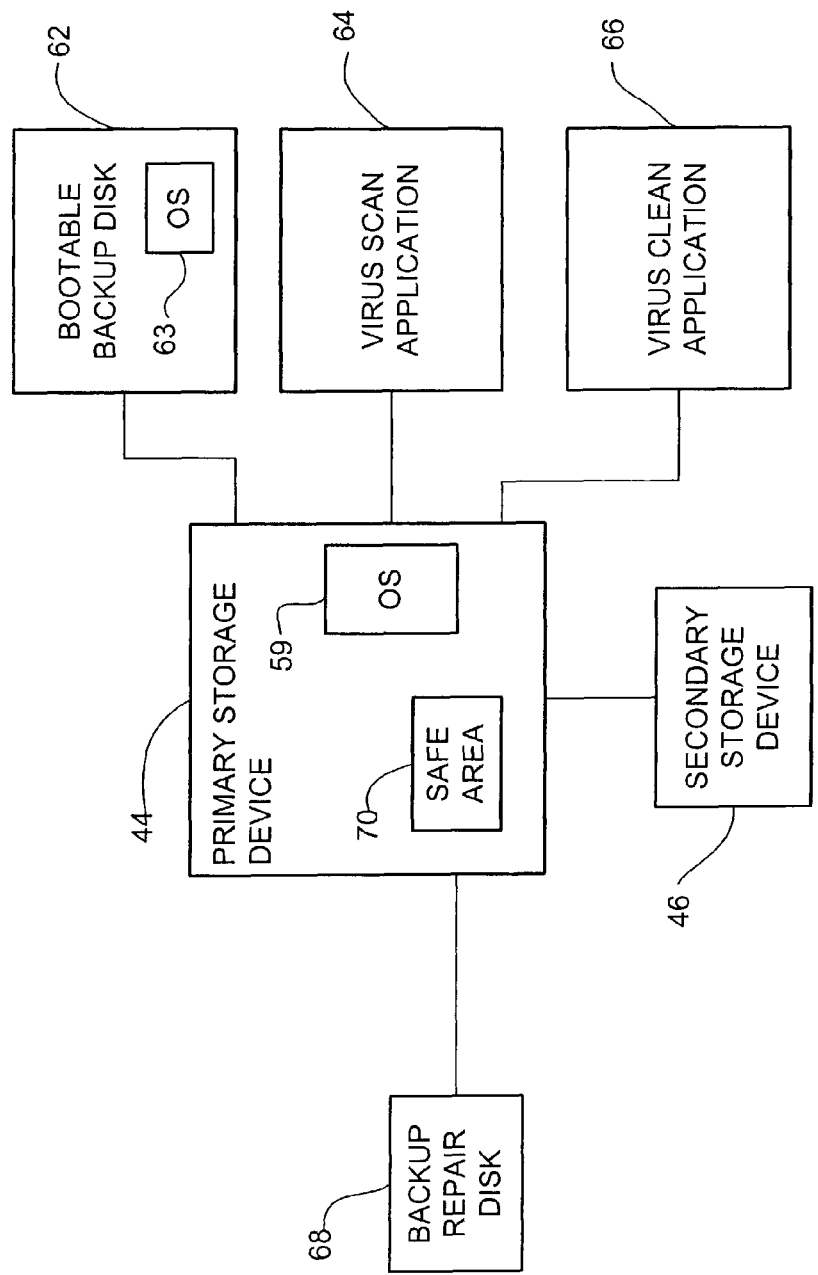
FIG. 3 is a block diagram illustrating an embodiment of the invention.

FIG. 3 is a block diagram illustrating one embodiment of the system of the present invention. As previously described, a safe area 70 is defined on a hard drive 44, or other suitable storage device (primary storage device) used to store executable programs, (primary) operating system 59, and data. The operating system 59 generally operates to control and manage the resources of the computer system. Execution of the operating system 59 is initiated upon turning the computer power on or resetting the computer. The operating system 59 is booted by execution of a portion of code stored in a boot sector on the hard disk drive 44. The boot code then calls the main operating system code. The hard drive 44 may have, for example, NTFS (New Technology File System) volumes including an NTFS volume boot sector. The system further includes a bootable backup disk 62 for booting the computer system 20 utilizing a backup (secondary) operating system 63, a virus scan application 64 for performing a virus scan of the hard drive, and a virus clean application 66 for cleaning infected files identified during scanning. It is to be understood that the bootable disk 62 may include the virus scanner 64 and cleaner 66 or these applications may be located on a separate disk. For example, one disk may be utilized to boot, scan, and clean, regardless of the type of operating system stored on the hard drive. In one embodiment, the virus scanning and cleaning applications 64, 66 are combined into an anti-virus program as described below.

A secondary storage device 46 (e.g., removable storage device such as floppy disk 38 (e.g., 720 kb low-density or 1.44 MB high density 3.5 inch diskette) or CD-ROM 34) is used to identify the location of the safe area on the hard drive 44. A backup repair disk 68, such as an Emergency Repair Disk (ERD) created by a backup utility is used to define the safe area 70 on the hard drive 44. The safe area 70 can be safely accessed when the computer system is booted from secondary operating system 63 and contains information on how to recover the computer system if the cleaning operation prevents the system from booting.

Figure 4:
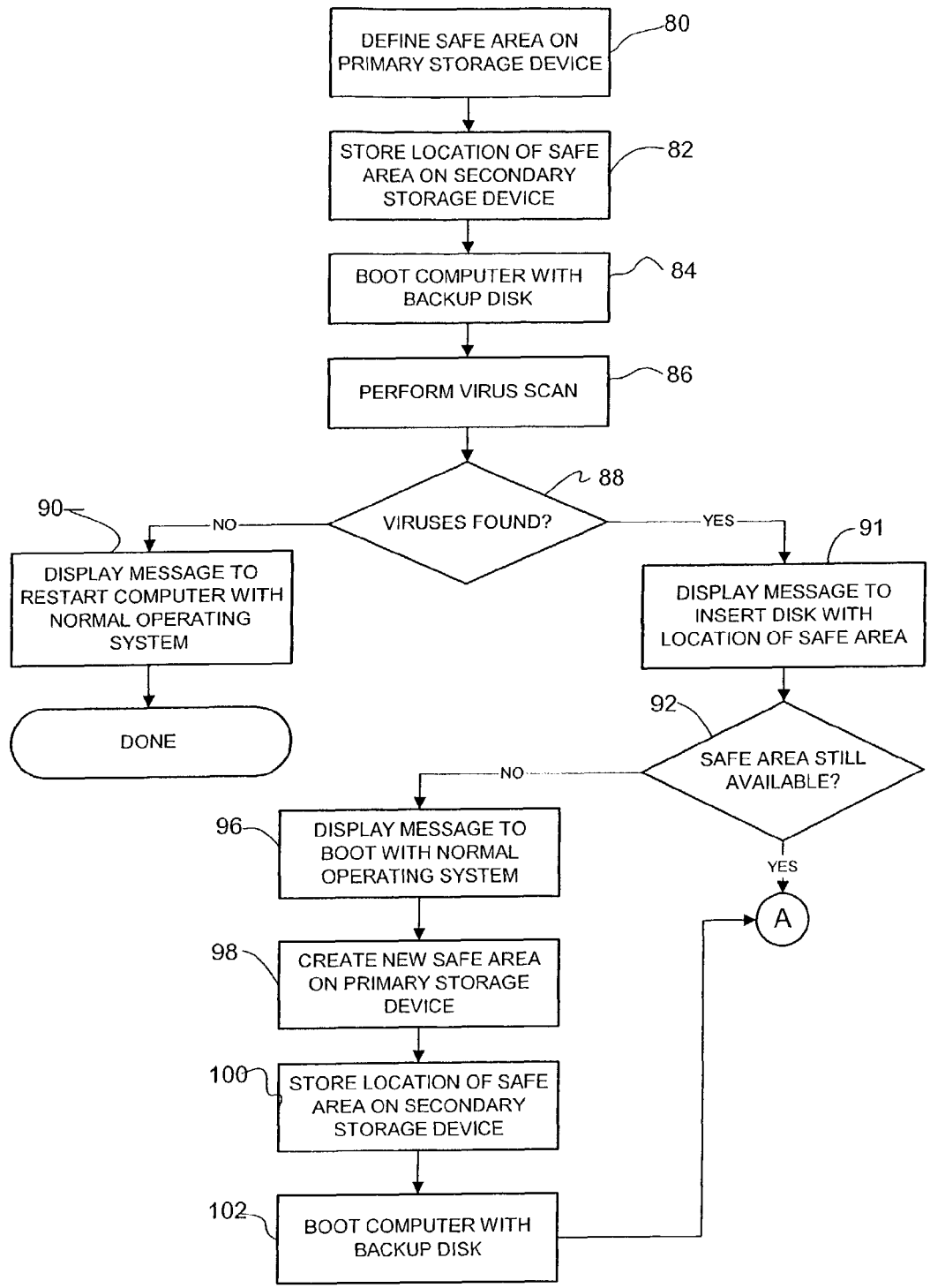
FIG. 4 is a flowchart illustrating a process for defining a safe area for storing information on changes made during a virus cleaning operation.
Figure 5:
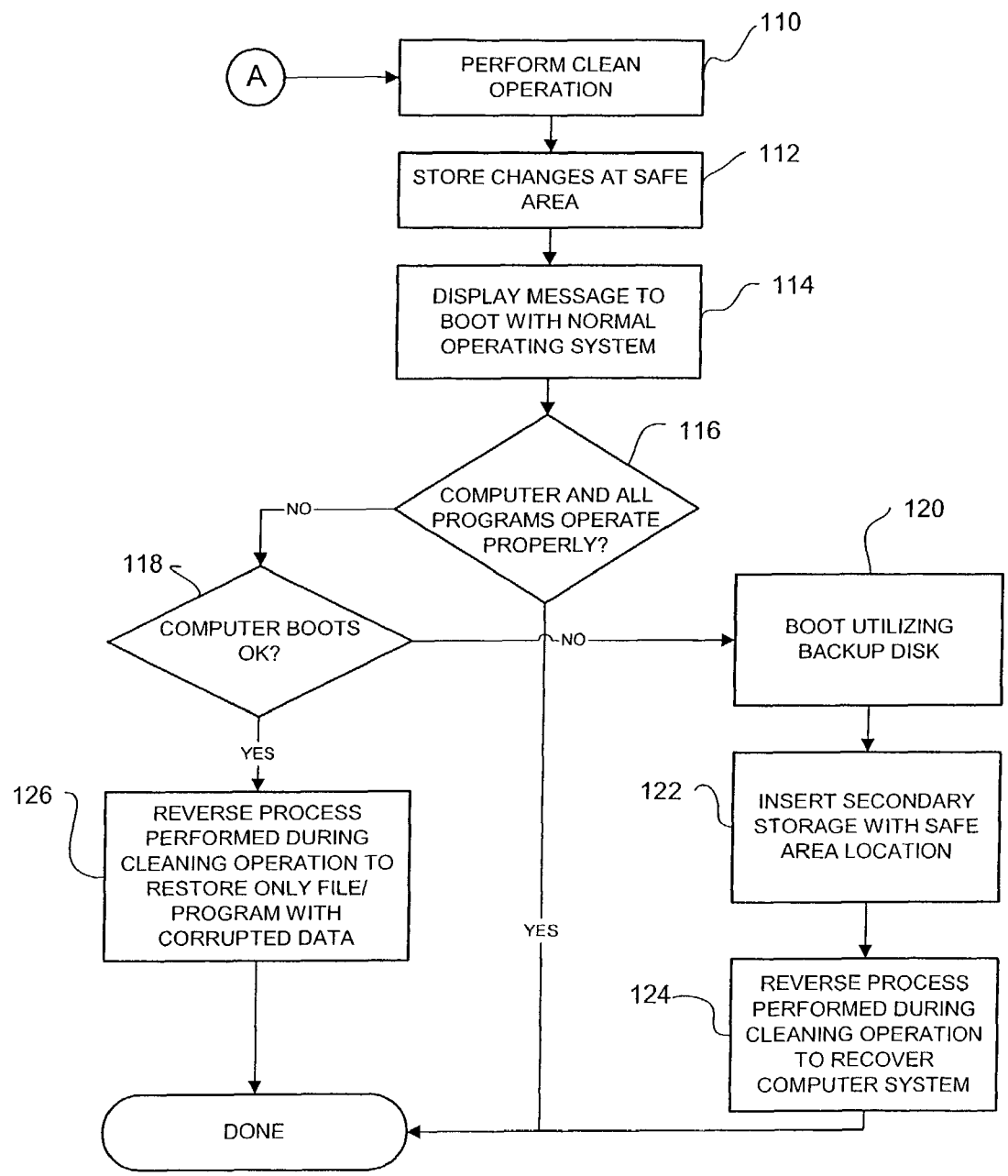
FIG. 5 is a flowchart illustrating a process for returning a computer system to its earlier configuration if data is corrupted during the cleaning process.

FIGS. 4 and 5 are flowcharts illustrating a process for defining the safe area 70 on the computer system and using data stored in the safe area to recover the computer system. The computer system is first booted using its normal operating system. Before a virus scan or clean operation is performed, the safe area 70 is defined on the hard drive 44 and the location is stored on the secondary storage device 46 (steps 80 and 82 of FIG. 4). A user may be prompted by a message on the display to insert appropriate disks as required. The emergency repair disk 68 (or other disk containing a suitable utility program) is used to create a new file for the safe area 70 on the hard drive 44. The new file is filled with content that forms a detectable pattern for each cluster allocated to that file. The file size may be a predetermined size or it may be set by the user or utility based on how much data is likely to be modified during a cleaning operation. After the safe area file is created on the hard drive 44, the user inserts the secondary storage device 46 (e.g., floppy disk) and the location of the safe area 70 and pattern used to initialize the area are recorded on the disk. After this information is stored on the disk 46, the user is displayed a message to remove the disk and boot the computer using the backup disk 62 (step 84).

After the computer system is booted utilizing the backup operating system 63, the hard drive 44 is scanned for viruses (step 86). Only a portion of the hard drive 44 may be scanned or the entire disk may be scanned. If the hard drive 44 is found to be clean, the user receives a message that no viruses were found and to restart the computer (steps 88 and 90). The computer is then booted as usual from its normal operating system 59. The computer may also be booted from its normal operating system automatically if no viruses are found. If a virus is found, the system checks to see if there is a safe area 70 defined on the hard drive 44 and if it is still available (steps 91 and 92). A message is displayed to the user requesting insertion of disk 46 containing the information on the location of safe area 70. The information is used to verify that the location of the safe area clusters is correct by comparing the information on the safe area 70 of the disk with the stored pattern on the secondary storage device 46. If the locations and patterns of the safe area 70 match those on disk 46, it is safe to write directly to the allocated sectors. If the safe area sectors are no longer available, the computer is booted while infected utilizing primary operating system 59, and a new safe area 70 is defined on the hard drive (steps 96 and 98). The new location and patterns of safe area 70 are stored on disk 46 (step 100) and the computer is booted with the backup disk 62 (step 102).

Once the safe area 70 is defined and the location and pattern information is stored on the secondary storage device 46, the cleaning process can begin (FIG. 5). At step 110, the cleaning operation is performed. Changes made to the hard drive 44 are saved to safe area 70 on the hard drive along with information on how to revert back to its configuration prior to the cleaning operation (step 112). The safe area 70 may include, for example, a record of the changes made, a copy of the original data and location on the disk 44, or a list of expected changes. This information is then used to return the hard drive 44 to its original configuration or to verify that the changes made will correct a problem when the system is booted to the primary operating system 59.

After the system is cleaned, the user is prompted to boot the system with its normal operating system 59 (step 114). If the computer system 20 restarts and all programs function properly, the process is completed (step 116). If the operating system does not boot correctly or does not boot at all, the computer is booted using the backup disk 62 (steps 116, 118, and 120). The secondary storage device 46 is inserted and the computer is returned to the state it was in prior to the cleaning process (steps 122 and 124). The user may receive a message informing him that the computer could not be cleaned without disrupting normal operation of the computer system. If the computer system boots but a file or program is not working properly, the specific file or program is restored to its pre-clean configuration (steps 118 and 126). Since the hard drive 44 knows where the safe area 70 is located, there is no need to insert the disk 46 to restore only files or programs to their pre-clean configuration. The computer system may display a message to the user that certain files or programs are still infected.

It is to be understood that the process described above and illustrated in FIGS. 4 and 5 is only one example and that a process may include additional or fewer steps, or the order of the steps may vary without departing from the scope of the invention. Furthermore, the method described herein may be used to restore a computer system to an earlier configuration regardless of the reason for changes to the storage device. For example, the changes may be made during an update to an application or program on the storage device or for any other reason.

The anti-virus program used to scan for viruses and clean infected data may be, for example, an application such as McAfee's VSHIELD, ACTIVESHIELD, SCAN NOW or VIRUSSCAN brand programs, or anti-virus applications described in U.S. Pat. No. 6,029,256, issued Feb. 22, 2000 or U.S. Pat. No. 6,035,423 issued Mar. 7, 2000, which are incorporated herein by reference in their entirety, or any other suitable anti-virus program. The anti-virus program may be accessed from a removable storage device or installed on the computer 20 by a disk or CD-ROM, or downloaded directly from the Internet, for example.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for defining an area to record changes made to a computer system, the method comprising:
    defining a safe area on a primary storage device of the computer system, said primary storage device containing a primary operating system;
    storing information on the location of the safe area on a secondary storage device;
    booting the computer system utilizing a backup device;
    changing data on said primary storage; and
    recording changes made to said primary storage device in the safe area of said primary storage device, wherein the recorded changes are accessible with the computer system booted from the backup device.

2. The method of claim 1 further comprising accessing data stored in the safe area to restore at least a portion of said primary storage device to an earlier configuration.

3. The method of claim 2 wherein said earlier configuration is a configuration prior to cleaning said primary storage device of viruses.

4. The method of claim 2 wherein restoring at least a portion of said primary storage device comprises reading the location of the safe area from the secondary storage device.

5. The method of claim 1 wherein changing data on said primary storage device comprises cleaning infected files on said primary storage device of viruses.

6. The method of claim 5 further comprising scanning said primary storage device to identify said viruses.

7. The method of claim 5 wherein the cleaning of said infected files on said primary storage device of said viruses comprises cleaning said infected files identified during scanning.

8. The method of claim 5 wherein the cleaning of said infected files on said primary storage device of said viruses comprises changing data in said infected files.

9. The method of claim 1 wherein said primary storage device is a hard drive.

10. The method of claim 9 wherein defining a safe area comprises utilizing a backup disk to create a file on the hard drive.

11. The method of claim 10 further comprising filling the file with content that forms a detectable pattern for clusters allocated to the file.

12. The method of claim 11 wherein storing information on a location of the safe area comprises storing the pattern used to initialize the safe area.

13. The method of claim 1 wherein the secondary storage device is a removable storage device.

14. The method of claim 13 wherein the removable storage device is a floppy disk.

15. The method of claim 1 wherein the backup device comprises a backup operating system.

16. The method of claim 1 further comprising verifying that the safe area on said primary storage device is still available prior to changing data on said primary storage device.

17. The method of claim 16 wherein verifying that the safe area is still available comprises comparing information within the safe area to information stored on said secondary storage device.

18. The method of claim 1 further comprising booting the computer system using the primary operating system after changing data to determine if the data on said primary storage device is corrupted.

19. The method of claim 18 further comprising restoring said primary storage device to an earlier configuration if the computer system fails to boot using the primary operating system.

20. The method of claim 1 wherein recording changes made to said primary storage device comprises recording original data from said primary storage device.

21. The method of claim 20 further comprising recording a location of the original data.

22. The method of claim 1 wherein the recorded changes are changes expected to be made to said primary storage device during a virus cleaning operation.

23. The method of claim 1 wherein changing data on said primary storage device comprises updating data.

24. The method of claim 1 wherein changing data on said primary storage device comprises installing a patch.

25. A computer program product embodied on a non-transitory computer readable medium for defining an area to record changes made to a computer system, the product comprising:
    computer code that defines a safe area on a primary storage device of the computer system, the primary storage device containing a primary operating system;
    computer code that stores information on the location of the safe area on a secondary storage device;
    computer code that boots the computer system utilizing a backup device;
    computer code that changes data on said primary storage device by cleaning infected files on said primary storage device of viruses identified during scanning; and
    computer code that records changes made to said primary storage device as a result of the cleaning in the safe area of said primary storage device, wherein the recorded changes are accessible with the computer system booted from the backup device.

26. The computer product of claim 25 further comprising code that restores at least a portion of said primary storage device to an earlier configuration if data on said primary storage device is corrupted.

27. A method for restoring a computer system to a pre-virus cleaning configuration, the method comprising:
    booting a computer system utilizing a backup operating system;
    scanning a primary storage device for viruses, said primary storage device including a primary operating system;
    cleaning infected files on said primary storage device of viruses identified during scanning;
    recording changes made to said primary storage device during the cleaning in a predefined area of said primary storage device;
    attempting to boot the computer system utilizing the primary operating system; and
    restoring at least a portion of said primary storage device to its configuration prior to the cleaning if the computer system is not able to boot utilizing the primary operating system.

28. The method of claim 27 wherein restoring at least a portion of said primary storage device comprises booting the computer system utilizing the backup operating system.

29. The method of claim 28 further comprising reading a secondary storage device to identify a location of the predefined area of said primary storage device.

30. A computer program product embodied on a non-transitory computer readable medium for restoring a computer system to a pre-virus cleaning configuration, the product comprising:

code that boots a computer system utilizing a backup operating system;

code that scans a primary storage device for viruses, said primary storage device including a primary operating system;

code that cleans infected files on said primary storage device of viruses identified during scanning;

code that records changes made to said primary storage device during the cleaning in a predefined area of said primary storage device;

code that attempts to boot the computer system utilizing the primary operating system; and code that restores at least a portion of said primary storage device to its configuration prior to the cleaning if the computer system is not able to boot utilizing the primary operating system.

* * * * *

UNITED STATES PATENT AND TRADEMARK OFFICE
CERTIFICATE OF CORRECTION

PATENT NO. : 8,069,480 B1
APPLICATION NO. : 10/262307
DATED : November 29, 2011
INVENTOR(S) : Lee Codel Lawson Tarbotton et al.

Page 1 of 1

It is certified that error appears in the above-identified patent and that said Letters Patent is hereby corrected as shown below:

In the Claims:

In column 7, line 13, In Claim 1, delete "hooting" and insert -- booting --, therefor.

Signed and Sealed this
Eighth Day of October, 2013

Teresa Stanek Rea
*Deputy Director of the United States Patent and Trademark Office*